US011896126B2

(12) United States Patent
Xu et al.

(10) Patent No.: US 11,896,126 B2
(45) Date of Patent: Feb. 13, 2024

(54) DEVICE FOR STORAGE OF PRODUCTS

(71) Applicant: TRIPLE WIN TECHNOLOGY(SHENZHEN) CO. LTD., Shenzhen (CN)

(72) Inventors: Hui Xu, Shenzhen (CN); Xiang-Chun Deng, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 17/731,527

(22) Filed: Apr. 28, 2022

(65) Prior Publication Data

US 2023/0148750 A1 May 18, 2023

(30) Foreign Application Priority Data

Nov. 15, 2021 (CN) ......................... 202122791132.9

(51) Int. Cl.
*A47B 88/43* (2017.01)
*A47B 88/90* (2017.01)
(Continued)

(52) U.S. Cl.
CPC ............ *A47B 88/43* (2017.01); *A47B 88/402* (2017.01); *A47B 88/417* (2017.01); *A47B 88/50* (2017.01);
(Continued)

(58) Field of Classification Search
CPC . E05B 65/467; A47B 88/417; A47B 88/0451; A47B 88/402; A47B 88/0455;
(Continued)

(56) References Cited

U.S. PATENT DOCUMENTS 113,871 A * 4/1871 Gibbons .............. A47B 88/402 384/23
3,729,242 A * 4/1973 Barney .................. A47B 88/90 312/348.3
3,733,113 A * 5/1973 Glassford .............. A47B 88/57 312/348.1
3,929,386 A * 12/1975 Read .................... A47B 88/483 384/22

(Continued)

FOREIGN PATENT DOCUMENTS

CN 108209202 A * 6/2018
DE 20216477 U1 * 1/2003 ............. A47B 67/04

(Continued)

*Primary Examiner* — Andrew M Roersma
(74) *Attorney, Agent, or Firm* — ScienBiziP, P.C.

(57) ABSTRACT

A device with enhanced long-term cleanliness for storing products includes a frame, pairs of supporting structures, and trays. The pairs of supporting structures are connected to opposite walls of the frame, and positioned in a receiving cavity of the frame. Each supporting structure includes a slide rail. The trays are detachably connected to the supporting structure. Each tray includes a mounting plate and two supporting portions, the mounting plate is connected to the two supporting portions, two supporting portions of each tray are positioned on the two slide rails of one supporting structure pair and are movable along two slide rails. The supporting structure in the frame and the supporting portion of the tray reduces connecting areas between the tray and the frame, the slide rails allowing easy movement of the trays, reducing metal and other debris generated over long usage of the facility.

13 Claims, 6 Drawing Sheets

12

(51) Int. Cl.

| | |
|---|---|
| ***E05B 65/467*** | (2017.01) |
| ***A47B 88/417*** | (2017.01) |
| ***A47B 88/40*** | (2017.01) |
| ***A47B 88/50*** | (2017.01) |
| ***A47B 88/988*** | (2017.01) |

(52) U.S. Cl.
CPC ............ *A47B 88/90* (2017.01); *A47B 88/988* (2017.01); *E05B 65/467* (2013.01); *A47B 2210/0037* (2013.01)

(58) Field of Classification Search
CPC ... A47B 88/457; A47B 88/0414; A47B 88/50; A47B 88/988; A47B 46/00; A47B 46/005; A47B 2210/0037; A47B 2210/0086; A47B 63/06; A47B 67/00; A47B 67/04; A47B 81/00
See application file for complete search history.

(56) References Cited

U.S. PATENT DOCUMENTS

| | | | | | |
|---|---|---|---|---|---|
| 4,629,263 | A * | 12/1986 | Hendriks | E05B 65/467 | 312/216 |
| 4,950,039 | A * | 8/1990 | Helling | A47B 67/04 | 312/249.11 |
| 10,085,556 | B2 * | 10/2018 | Chien | A47B 88/70 | |
| 2007/0170828 | A1 * | 7/2007 | Hoshide | E05F 15/635 | 312/319.5 |

FOREIGN PATENT DOCUMENTS

| | | | | |
|---|---|---|---|---|
| EP | 1138856 | A1 * | 10/2001 | A47B 46/00 |
| KR | 200301747 | Y1 * | 1/2003 | A47B 88/04 |
| KR | 101837052 | B1 * | 4/2018 | A47B 46/00 |

* cited by examiner

12

DEVICE FOR STORAGE OF PRODUCTS

FIELD

The subject matter herein relates to technical field of storage and transportation, especially relates to a device for storage of products.

BACKGROUND

In the field of industrial production, many processes involve the storage and transportation of products, such as lens. For storing products or semi-finished products with definite shape, a frame with multiple trays is usually used for storage and transportation.

However, in the actual use process of the device for storage of products, frequent usage of the trays can strike metal debris from contacting surfaces between the trays and dents and deformation of the trays, which can not only cause dangers to the health of operators, but also pollute the transported products, affect the workshop environment, and increase the potential cleaning cost.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DESCRIPTION OF MAIN COMPONENTS OR ELEMENTS

Figure 1:
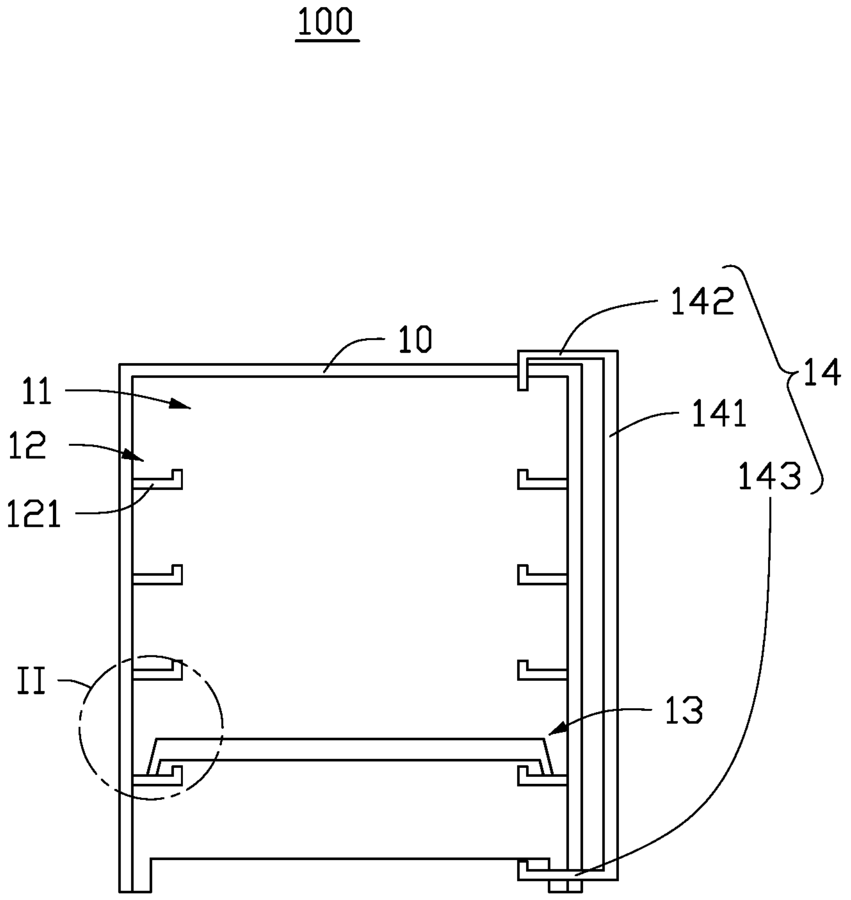
FIG. 1 is a schematic view of a device for storage of products in an embodiment according to the present disclosure.

Device for storage of products 100;
Frame 10;
Receiving cavity 11;
Supporting structure 12;
Sliding rail 121;
Roller 1211;
Conveyor belt 1212;
Connecting portion 123;
Blocking portion 124;
Guiding portion 125;
Inclined surface 1251;
First arc surface 1252;
Second arc surface 1253;
Tray 13;
Mounting plate 132;
Receiving groove 1321;
Supporting portion 133;
Supporting protrusion 1331;

Supporting groove 1332;
Locking member 14.

DETAILED DESCRIPTION

In order to make the above-mentioned objects, features, and advantages of the present application more obvious, a description of specific embodiments of the present application will be described with reference to the accompanying drawings. The present application can be implemented in many ways different from those described herein, and those skilled in the art can make similar improvements without violating the contents of the present application. Therefore, the present application is not to be considered as limiting the scope of the embodiments to those described herein.

Several definitions that apply throughout this disclosure will now be presented.

Unless otherwise defined, all technical and scientific terms used herein have the same meaning as commonly understood by one skilled in the art. The terms used in the present application herein are only for describing specific embodiments, and are not intended to limit the present application.

Referring to FIG. 1, a first embodiment of the present disclosure discloses a device for storage of products 100 for storing products. The device for storage of products 100 includes a frame 10 and a plurality of trays 13. The frame 10 includes a receiving cavity 11. Supporting structures 12 in pairs are connected to opposite walls of the frame 10, all pairs being positioned in the receiving cavity 11. Each supporting structure 12 includes a slide rail 121. The trays 13 are detachably connected to the supporting structures 12. Each tray 13 includes a mounting plate 132 and two supporting portions 133. The mounting plate 132 is connected to each of the two supporting portions 133. Two supporting portions 133 of each tray are positioned on two slide rails 121 of one pair of the supporting structures 12, and are movable along two slide rails 121 of the pair of the supporting structure 12. The trays 13 can be installed on or removed from the supporting structures 12 through an opening between the opposite inner walls of the frame 10.

The products include but are not limited to elements with solid and stable shapes such as camera assemblies or lens of electronic products. The products are fixed and placed in the device for storage of products 100 through the tray 13 to facilitate the storage and transportation of products. The supporting structures 12 are stacked and spaced along inner walls in the frame 10. Each supporting structure 12 is basically arranged in parallel, and the tray 13 is arranged on one pair of supporting structures 12. In the first embodiment of the present disclosure, slide rails 121 are symmetrically arranged on each pair of the supporting structures 12, and the tray 13 can be inserted or extracted from one end of the supporting structure 12. The other end of each supporting structure 12 is provided with a blocking part. The blocking part can be a baffle positioned at an end of the slide rail 121 to prevent the tray 13 from sliding out from the other side of the supporting structure 12, to ensure the stability of the tray 13 when the product is stored.

Figure 2:
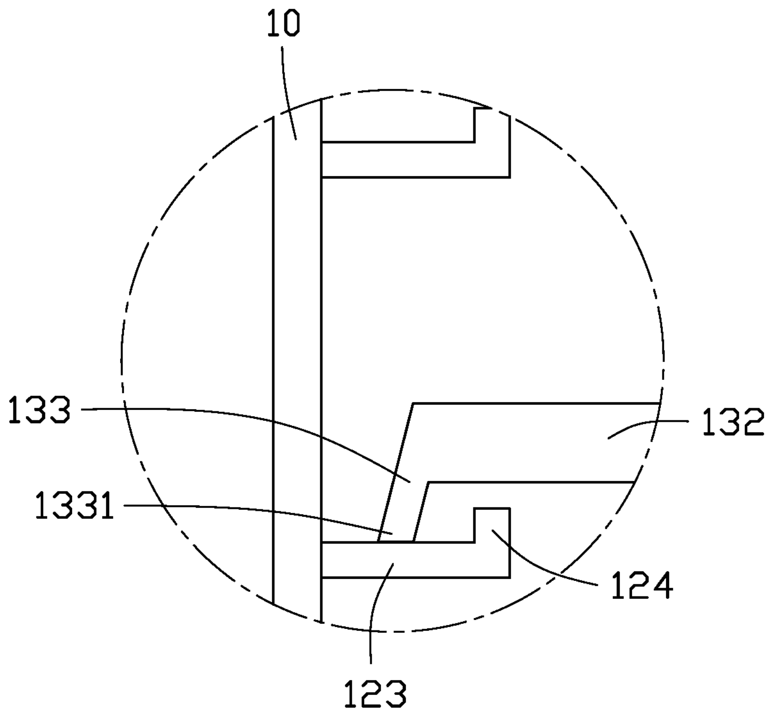
FIG. 2 is an enlarged structural view of a supporting structure of the device for storage of products of FIG. 1.

Referring to FIG. 2, in one embodiment of the present disclosure, the slide rail 121 includes a connecting portion 123 and a blocking portion 124, and the connecting portion 123 is positioned between the blocking portion 124 and the frame 10.

The connecting portion 123 is a part of the slide rail 121 that supports the tray 13, when the tray 13 slides on the slide rail 121, and the connecting portion 123 is connected to the inner wall of the frame 10. The blocking portion 124 is connected to the connecting portion 123 and protrudes from an upper surface of the connecting portion 123. A depression is formed between the connecting portion 123 and the blocking portion 124, so that dust and debris from any source are blocked by the blocking portion 124 instead of falling into the tray 13.

In one embodiment, the supporting portion 133 is provided with a support protrusion 1331. The support protrusion 1331 is arranged at a side of the tray 13. A guide groove is formed between the connecting portion 123 and the blocking portion 124, a portion of the support protrusion 1331 is arranged in the guide groove, and the support protrusion 1331 abuts the connecting portion 123.

The support protrusion 1331 protrudes downward from the mounting plate 132. The mounting plate 132 is connected between the two support portions 133 and is configured for accommodating and positioning products. When the tray 13 is installed or removed, the support protrusion 1331 is in contact with the connecting portion 123 and presents dynamic friction. At this time, the generated debris and dust are blocked by the blocking portion 124 and will be collected on the connecting portion 123, which will not pollute the product and is easier for the user to clean.

Figure 3:
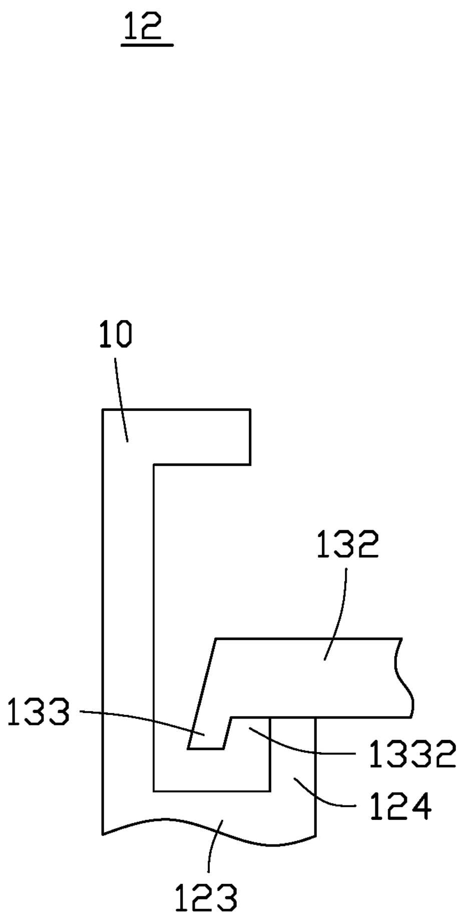
FIG. 3 is a schematic view of a supporting structure of the device for storage of products of another embodiment.

Referring to FIG. 3, in another embodiment, the supporting portion 133 is provided with a supporting groove 1332. The supporting groove 1332 receives the blocking portion 124. A surface of the blocking portion 124 close to the supporting groove 1332 is a first surface, and a bottom surface of the supporting groove 1332 abuts the first surface of the blocking portion 124.

The first surface is a top surface of the blocking portion 124 from the viewing angle as shown in FIG. 3. In this embodiment, the bottom surface of supporting groove 1332 abuts against the top surface of the blocking portion 124, and other parts of the supporting portion 133 are received in a space between a side of the connecting portion 123 and the inner wall of the frame. When installing or removing the tray 13, the bottom surface of the supporting groove 1332 abuts against the top surface of the blocking portion 124 and presents dynamic friction. The blocking portion 124 in this embodiment is designed to be wider and the size is expanded by 20~40% compared with other embodiments. Therefore, the contact area during sliding is larger and the debris generated is relatively less, thus reducing the generation of debris.

Figure 4:
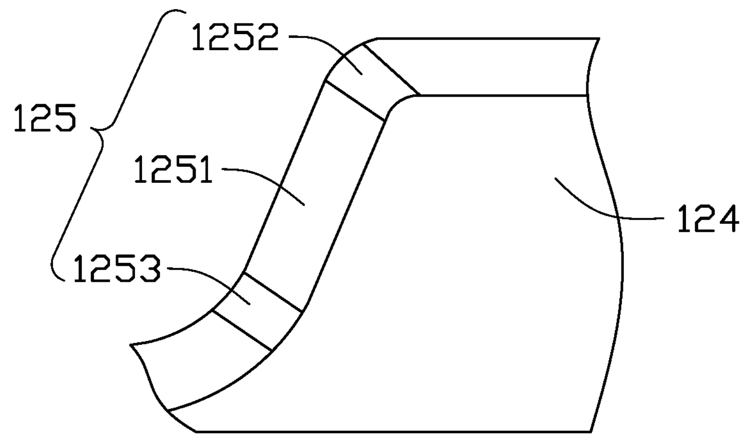
FIG. 4 is a schematic view of a guiding portion of the device for storage of products of FIG. 1.

Referring to FIG. 4, in one embodiment, the blocking portion 124 includes a guiding portion 125. The guiding portion 125 is arranged at an end of the blocking portion 124 and is close to the opening of the frame.

The guiding portion 125 can be inclined to the bottom of the blocking portion 124, to have a smooth transition effect. While facilitating disassembly and assembly, it can also make the installation process smoother and reduce the generation of debris.

The guiding portion 125 includes an inclined surface 1251, a first arc surface 1252, and a second arc surface 1253. The inclined surface 1251 is connected between the first arc surface 1252 and the second arc surface 1253. The second arc surface 1253 faces the opening of the frame 10. The first arc surface 1252 and the second arc surface 1253 allow smoother disassembly of the tray 13, reduce the friction during installation alignment and further reduce the generation of debris.

Figure 5:
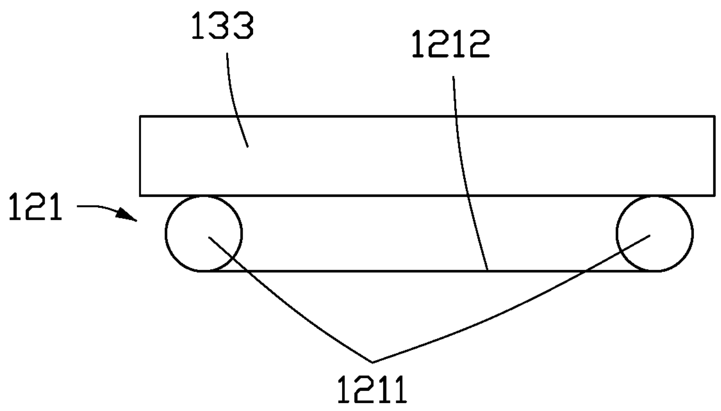
FIG. 5 is a schematic view of a sliding structure of the device for storage of products of another embodiment.

Referring to FIG. 5, in another embodiment, each slide rail 121 includes rollers 1211 and a conveyer belt 1212. The rollers 1211 are rotatably connected to the frame 10. The conveyor belt 1212 is sleeved on the rollers 1211, and the conveyer belt 1212 supports the supporting portion 133 of the tray 13. The friction of sliding during the installation of the tray 13 is replaced with reduced rolling friction by using the rollers, the generation of debris and dust can be effectively reduced.

In one embodiment, the frame 10 is provided with ventilation grooves. The ventilation grooves are defined on side walls of the frame 10, and the ventilation grooves communicate with the receiving cavity 11. Ventilation grooves also can reduce a total weight of the device for storage of products 100 by reducing material consumption. When the stored products have just been processed and have a certain temperature, the ventilation grooves operate to cool the products.

Figure 6:
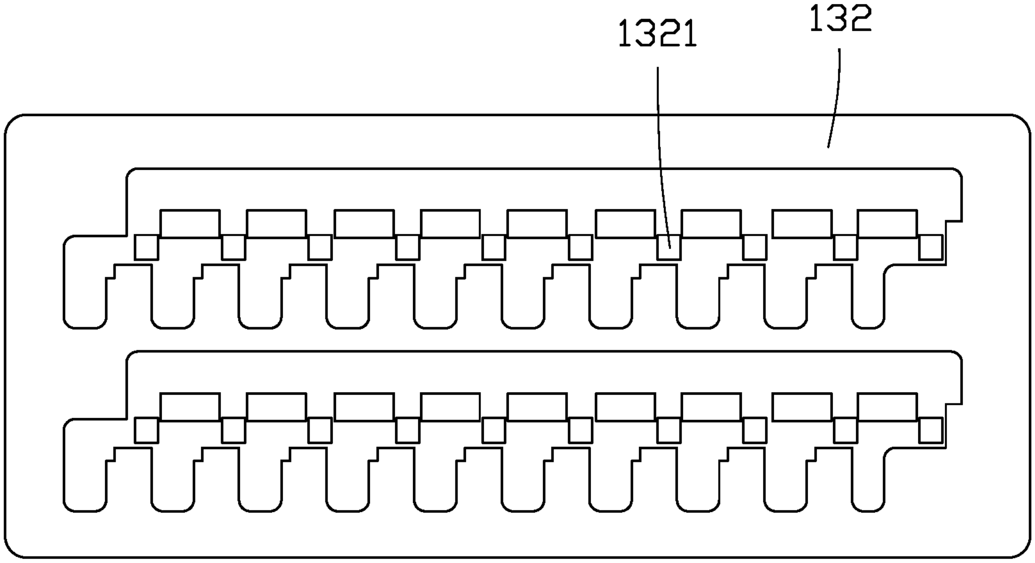
FIG. 6 is a schematic view of mounting plates in a tray of the device for storage of products of FIG. 1.

Referring to FIG. 6, in one embodiment, receiving grooves 1321 are defined parallel in the mounting plate 132, and the receiving groove 1321 is used to receive the product. A shape of the receiving groove 1321 can be designed according to the specific products, to ensure that the products can be stably positioned on the tray 13 to avoid dislocation and damage during disassembly and transportation.

In one embodiment, the product storage device 100 further includes a locking member 14. The locking member 14 is rotatably connected to the frame 10, and the locking member 14 detachably abuts the tray 13. The locking member 14 is used to fix the tray 13 in the receiving cavity 11.

The locking member 14 can be a rod-shaped member. The locking member 14 comprises a main body 141, a first end portion 142, and a second end portion 143 connected in one piece. The main body 141 is positioned at an outer side of the frame 10, the first end portion 142 is rotatably connected to a top plate of the frame 10, and the second end portion 143 is detachably connected to a bottom plate of the frame 10.

When the locking member 14 rotates and locks the opening of the frame 10, the main body 141 of the locking member 14 abuts the trays 13, and the locking member 14 prevents the tray 13 from sliding out from the opening of the frame 10. When the locking member 14 rotates to the outer side of the frame 10, the tray 13 can be installed in the frame 10 or removed from the frame 10.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A device configured for storage of products, comprising:
   - a frame, wherein a receiving cavity is formed in the frame;
   - a plurality of pairs of supporting structures connected to opposite walls of the frame and positioned in the receiving cavity, each of the supporting structures comprising a slide rail; and
   - a plurality of trays detachably connected to the supporting structures, wherein each of the plurality of trays comprises a mounting plate and two supporting portions, the mounting plate is connected to each of the two supporting portions, the two supporting portions of each of the plurality of trays are positioned on the two slide rails of a corresponding one pair of the supporting structures and are movable along the two slide rails of the corresponding pair of the supporting structures;

the slide rail comprises a connecting portion and a blocking portion, the connecting portion is connected between the blocking portion and the frame;

the blocking portion comprises a guiding portion, the guiding portion is positioned at an end of the blocking portion facing an opening between the opposite walls of the frame;

the guiding portion is inclined to a bottom of the blocking portion; and the guiding portion comprises an inclined surface, a first arc surface, and a second arc surface, the inclined surface is connected between the first arc surface and the second arc surface, the second arc surface faces the opening.

2. The device of claim 1, wherein the supporting portion comprises a supporting protrusion, the supporting protrusion is positioned at an end of the tray, a guiding groove is formed between the connecting portion and the blocking portion, a portion of the supporting protrusion is positioned in the guiding groove, and the supporting protrusion abuts the connecting portion.

3. The device of claim 2, wherein an end of the blocking portion is spaced from the mounting plate.

4. The device of claim 1, wherein a supporting groove is formed between the supporting portion and the mounting plate, the blocking portion is positioned in the supporting groove, and a top surface of the blocking portion abuts a bottom surface of the supporting groove.

5. The device of claim 1, wherein ventilation grooves are defined on side walls of the frame, and the ventilation grooves are communicated to the receiving cavity.

6. The device of claim 1, wherein a plurality of receiving grooves are defined on the mounting plate to receive products.

7. A device configured for storage of products, the device comprising:

a frame, wherein a receiving cavity is formed in the frame;

a plurality of pairs of supporting structures connected to opposite walls of the frame and positioned in the receiving cavity, each of the supporting structures comprises a slide rail;

a plurality of trays detachably connected to the supporting structures, wherein each of the plurality of trays comprises a mounting plate and two supporting portions, the mounting plate is connected to each of the two supporting portions, the two supporting portions of each said tray are positioned on the two slide rails of a corresponding pair of the supporting structures, and are movable along the two slide rails of the corresponding pair of the supporting structures; and a locking member rotatably connected to the frame, and the locking member detachably abutting the plurality of trays;

the slide rail comprises a connecting portion and a blocking portion, the connecting portion is connected between the blocking portion and the frame;

the blocking portion comprises a guiding portion, the guiding portion is positioned at an end of the blocking portion facing an opening between the opposite walls of the frame;

the guiding portion is inclined to a bottom of the blocking portion; and the guiding portion comprises an inclined surface, a first arc surface, and a second arc surface, the inclined surface is connected between the first arc surface and the second arc surface, the second arc surface faces the opening.

8. The device for storage of products of claim 7, wherein the locking member comprises a main body, a first end portion and a second end portion connected in one piece, the main body is positioned at an outer side of the frame, the first end portion is rotatably connected to a top plate of the frame, a part of the first end portion is arranged upon the top plate of the frame, and the second end portion is detachably connected to a bottom plate of the frame, and a part of the second end portion is arranged under the bottom plate of the frame.

9. The device for storage of products of claim 7, wherein the supporting portion comprises a supporting protrusion, the supporting protrusion is positioned at an end of the tray, a guiding groove is formed between the connecting portion and the blocking portion, a portion of the supporting protrusion is positioned in the guiding groove, and the supporting protrusion abuts the connecting portion.

10. The device for storage of products of claim 9, wherein an end of the blocking portion is spaced from the mounting plate.

11. The device for storage of products of claim 7, wherein a supporting groove is formed between the supporting portion and the mounting plate, the blocking portion is positioned in the supporting groove, and a top surface of the blocking portion abuts a bottom surface of the supporting groove.

12. The device for storage of products of claim 7, wherein ventilation grooves are defined on side walls of the frame, and the ventilation grooves are communicated to the receiving cavity.

13. The device for storage of products of claim 7, wherein a plurality of receiving grooves are defined on the mounting plate to receive products.

* * * * *